United States Patent
Ekin

(10) Patent No.: US 11,056,150 B2
(45) Date of Patent: Jul. 6, 2021

(54) MULTI-TIME SEARCH ANALYTICS

(71) Applicant: Akif Ekin, Istanbul (TR)

(72) Inventor: Akif Ekin, Istanbul (TR)

( * ) Notice: Subject to any disclaimer, the term of this patent is extended or adjusted under 35 U.S.C. 154(b) by 175 days.

(21) Appl. No.: 16/481,494

(22) PCT Filed: Feb. 8, 2018

(86) PCT No.: PCT/TR2018/050049
§ 371 (c)(1),
(2) Date: Jul. 29, 2019

(87) PCT Pub. No.: WO2019/013729
PCT Pub. Date: Jan. 17, 2019

(65) Prior Publication Data
US 2021/0125641 A1    Apr. 29, 2021

(30) Foreign Application Priority Data
Feb. 14, 2017   (TR) .................................. 2017/02177

(51) Int. Cl.
*G11B 27/00*    (2006.01)
*H04N 5/76*    (2006.01)
(Continued)

(52) U.S. Cl.
CPC ............ *G11B 27/102* (2013.01); *G06F 16/71* (2019.01); *G06F 16/735* (2019.01); *G06F 16/75* (2019.01);
(Continued)

(58) Field of Classification Search
CPC ........ G11B 27/00; G11B 27/102; H04N 5/76; G06G 16/784; G06F 16/953; G06F 16/75; G06F 16/735; G06K 9/00255; G06K 9/00718; G06K 9/00785; G06K 9/4652; G06K 2009/00783; G06K 2209/01; G06K 2209/15
(Continued)

(56) References Cited

U.S. PATENT DOCUMENTS 7,852,370 B2   12/2010   Peleg et al.
8,102,406 B2   1/2012    Peleg et al.
(Continued)

*Primary Examiner* — Daquan Zhao
(74) *Attorney, Agent, or Firm* — Bayramoglu Law Offices LLC

(57) ABSTRACT

Multi-time search analytics for smart video indexing based on active search and video database, which is configured to be operated without any need for a second broadcast with a camera, a second large data index, additional servers, a third additional software for indexing and analytics, a third additional face recognition system, a license recognition system, an object recognition system, or an additional net bandwidth for a new hardware. The method of operating multi-time search analytics for the additional net bandwidth for new hardware includes following steps: recognizing objects, activating software components and/or incoming alarms, collecting the alarms in an alarm database pool, extracting a first video with a same length in the alarm database pool, performing a motion recognition with H264/H265, recording detected motions by a video content recorder, transferring the detected motions to a timeline adjuster and changing the detected motions in accordance with an Alpha Time Zone.

18 Claims, 1 Drawing Sheet

(51) Int. Cl.
  *G06F 16/75*    (2019.01)
  *G11B 27/10*    (2006.01)
  *G06F 16/783*   (2019.01)
  *G06F 16/71*    (2019.01)
  *G06F 16/953*   (2019.01)
  *G06F 16/735*   (2019.01)
  *G08G 1/04*     (2006.01)
  *G06K 9/00*     (2006.01)
  *G06K 9/46*     (2006.01)

(52) U.S. Cl.
  CPC .......... *G06F 16/784* (2019.01); *G06F 16/953* (2019.01); *G08G 1/04* (2013.01); *H04N 5/76* (2013.01); *G06K 9/00255* (2013.01); *G06K 9/00718* (2013.01); *G06K 9/00785* (2013.01); *G06K 9/4652* (2013.01); *G06K 2009/00322* (2013.01); *G06K 2009/00738* (2013.01); *G06K 2209/01* (2013.01); *G06K 2209/15* (2013.01)

(58) Field of Classification Search
  USPC ................ 386/278, 280, 286, 239, 241, 248
  See application file for complete search history.

(56) References Cited

U.S. PATENT DOCUMENTS

| | | |
|---|---|---|
| 8,311,277 B2 | 11/2012 | Peleg et al. |
| 2011/0221895 A1* | 9/2011 | Sharma .................. H04N 7/188 |
| | | 348/143 |
| 2016/0034477 A1 | 2/2016 | Mao et al. |
| 2018/0032819 A1* | 2/2018 | Citerin ............... G06K 9/00771 |
| 2018/0033152 A1* | 2/2018 | Chen ....................... G06T 7/155 |

* cited by examiner

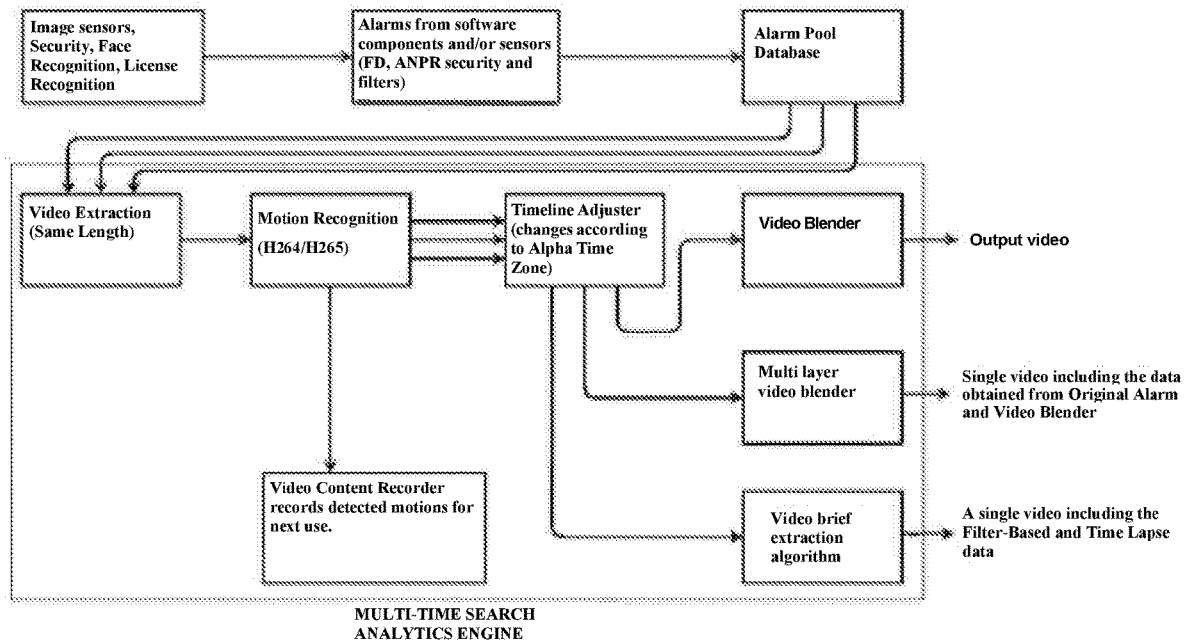

MULTI-TIME SEARCH ANALYTICS

CROSS REFERENCE TO THE RELATED APPLICATIONS

This application is the national phase entry of International Application No. PCT/TR2018/050049, filed on Feb. 8, 2018, which is based upon and claims priority to Turkish Patent Application No. 2017/02177, filed on Feb. 14, 2017, the entire contents of which are incorporated herein by reference.

TECHNICAL FIELD

The present invention; relates to multi-time search analytics for smart video indexing based on active search and video database.

BACKGROUND

Today, CCTV (closed-circuit television) cameras are used for surveillance or other security purposes in traffic, work places, shopping malls, stores and many similar places in order to monitor efficiency of employees or to obtain displays with regard to institutions and organizations such as a company. However, imaging systems and analytics of the images recorded are remarkably complicated and high cost systems. Continuous recordings cover a remarkably large area on database in terms of file size. This leads to some drawbacks in file storage and thereby causing the current files to be deleted in certain periods of time and new recordings to be made instead of deleted ones. Furthermore, another drawback is turning back to or monitoring the records made in any case or in any time is difficult due to excessive length of the videos. It takes a long time to make analysis and surveillance with regard to these processes. Apart from this time consuming process, video frames can be omitted or ignored in the systems that are not sufficiently precise. In current systems, BRIEFCAM company serves to conduct indexing processes in which video recordings are served in brief. However, working principle and operational mechanism of "BRIEFCAM" company are quite different from those of multi-time search analytics' according to our present invention.

According to the prior art patents of BRIEFCAM company, including U.S. Pat. No. 8,311,277 B2 "Method and System for Video Indexing and Video Synopsis", U.S. Pat. No. 8,102,406 B2 "Method and System for Producing a Video Synopsis" and U.S. Pat. No. 7,852,370" B2 "Method and System for Spatio-Temporal Video Warping"; said company conducts their indexing mechanism through frames by time stamping frame changes and then indexing them. Frame time is not necessarily important. According to our present invention, the initial frame time is a basically distinctive aspect. Another disadvantage according to this prior art document is that frame differences and color changes must be monitored during the record. In such a case, there is present a remarkable waste of processor power. A further drawback is that all camera recordings are kept on a single file. Considering file size limits, it leads to complexity in transferring the records, in other words, in terms of network and their storage.

Another disadvantage of the prior art systems is that said systems keep camera records on a single file and thereby cause an adversity in operating systems. Furthermore, it causes a great waste of sources to transfer a file with large size from a point to another in the prior art file systems.

When considering the current applications according to the prior art, it can be clearly seen that at present there are no applications that have similar characteristics as the multi-time search analytics according to the present invention.

SUMMARY

The present invention; relates to multi-time search analytics that is capable of being operated by using a single operator instead of multiple operators without performing a playback process on data for playback video which takes a huge time due to its Multi-Time playback and filter functions.

An aim of the present invention is to provide a system that can reduce the time for video searching.

Another aim of the present invention is to provide a system that can operate in a 100% compatibility with different subcomponents (Face recognition system, License recognition system, Motion Detector) and use the related records.

A further aim of the invention is to provide a system that can ensure a monitoring of what a vehicle or a person is currently doing at the very moment in a simultaneous and overlapped manner.

The present invention relates to multi-time search analytics so as to achieve all aforementioned aims which will be also apparent from the detailed description herein presented below.

In a preferred embodiment of the present invention, the invention has filters that can operate separately and in cooperation with a plurality of filters including a directional filter, a flow rate filter for vehicles and persons, a number filter for persons, a filter for motion, an advanced correlation filter for face recognition, an advanced correlation filter for vehicle recognition.

According to another preferred embodiment of the invention, the invention has a directional filter that acts to map all event times and also playback for them on a single screen.

In a further preferred embodiment of the invention, the invention has a video brief in two variations including a filter-based one and an accelerated one.

In another preferred embodiment of the invention, the invention has a video brief that can only present either motions or filters in a multi-time manner.

According to another preferred embodiment of the invention, the invention comprises functions of multi-time playback, filters, filter results, video management system and archive aging.

In another preferred embodiment of the invention, the invention has a function of Multi-time playback that allows the videos recorded to be displayed for 10 times at the same time.

In a further preferred embodiment of the invention, the invention comprises a recording engine, an indexing engine and a search engine.

In a further preferred embodiment of the invention, the invention has a recording engine that operates separately from the indexing engine.

According to another preferred embodiment of the invention, the invention has a search engine in which the file formats including avi, mp4, ts, mkv raw-frame, raw-H264/265 are supported.

In a further preferred embodiment of the invention, the invention has an indexing engine that operates on the recordings which are recorded by calculating length of the file being continuously recorded and indexing the later.

According to another preferred embodiment of the invention, the invention has a system that can be operated in several various platforms, networks of companies and on intranet or internet.

In a further preferred embodiment of the invention, the invention has a component-based system that is enterprise level, complex, scalable and distributed.

According to another preferred embodiment of the invention, the invention has a system that can use markers being put immediately when events take place and perform filtering process by putting minimum load on processor power.

In a further preferred embodiment of the invention, the invention has a system that can operate in a 100% compatibility with different subcomponents and keep recordings.

According to another preferred embodiment of the invention, the invention has a system that can index the initial frame time and perform an indexing process for length of video in nanosecond precision.

In a further preferred embodiment of the invention, the invention has a system that displays search results on the video display in an overlaid manner according to their types of time and alarm.

BRIEF DESCRIPTION OF THE DRAWINGS

FIGURES that are presented herein for a better understanding of the multi-time search analytics that has been developed according to the present invention are described below.

FIGURE is a flow chart of the multi-time search analytics.

DETAILED DESCRIPTION OF THE EMBODIMENTS

In this detailed description, the innovation developed according to the present invention is described without limiting the scope of the invention but only by way of illustration in order to disclose it more explicitly. Accordingly, components that constitute the multi-time search analytics are disclosed.

The system can reduce the time of video searching. An operator can perform a quick screening by simultaneously playing a number of related videos in overlapping layers.

The present invention can operate very quickly and perform a filtering process by putting a minimum load on processor power as it uses the markers put immediately when the events take place in database.

The system can operate in a 100% compatibility with different subcomponents (Face recognition system, License recognition system, Motion Detector) and use the related records. For example, it is capable of executing all video recordings on a single video at the same time. Else, it can filter videos of the vehicles having the same license and play them simultaneously by indicating the time. Thus what the vehicle or the person is currently doing at the very moment can be monitored in the video at the same time and in overlapped manner. This can dramatically reduce the time that is wasted by the operator for searching.

In brief, the multi-time search analytics according to the present invention operates based on the initial frame time. The initial frame time is indexed and then indexing process for length of video is carried out in nanosecond precision. It is distinguished in that it considerably operates at the enterprise level and has many criteria. The system is capable of using the CPU in a remarkably efficient manner. As it can share a large portion of data of the Video Management System that is embedded for fusion and integration in database. System makes possible to connect different recording files with one another at the same time plane. It is a type of system that is capable of using a plurality of files that are transferred in a more efficient and quicker manner not necessarily being limited with a single file.

The system operates at enterprise level and is designed such as to be component-based, complex, scalable and distributed and also for critical works.

The system can be operated in several various platforms (Windows and Linux), networks of companies and on intranet or internet. The system is data-driven, user-friendly and fulfils strict requirements for security, management and maintenance.

The recording engine that is included in the system can operate separately from the indexing engine. The aim of the recording engine is only to record frames without any loss. On the other hand, the indexing engine operates on the recordings recorded by calculating the length of the file that is continuously recorded and indexing the same. The most prominent advantage of this method is; the possibility of the system to index all database if the recordings are not lost. Another advantage of the search engine is that video files can be imported to database. Avi, mp4, ts, mkv raw-frame, raw-H264/265 formats can be supported in the system. Thus, the system can import and use its recording folders/files in different formats at the same line. Video Management System uses the big data embedded therein while the system executes all these processes.

Search results are displayed on the video display in an overlaid manner according to their types of time and alarm and they are simple to understand. The operator can focus with a single-click on the recording in which the event takes place out of these recordings displayed in an overlapping manner and then pass to normal display.

The present invention performs searching by collecting the systems such as face recognition system, license recognition system, motion detector on a single common and integrated database and visually represents the data obtained to the operator.

The system can be operated without any need for;
a second broadcast with camera,
a second large data index,
additional servers,
a third additional software for indexing and analytics,
a third additional face recognition system, a license recognition system and an object recognition system,
an additional net bandwidth for new hardware, by means of the multi-time search analytics according to the present invention.

Multi-Time Search Analytics uses several components while the system operates. These components include the following; the Multi-Time Search Analytics engine, the Video Management System, the Face recognition algorithm, the License recognition algorithm and database.

Multi-Time Search Analytics engine: uses database of the Video Management System. It applies filters to the current data and obtains valuable results.

Video Management System: Its main function is to perform indexing and recording the content of video. It consists of a system manager, a server software and a client software. It manages servers and the database. It serves to manage and control authorization and registration processes. It works with the face recognition algorithm, the license recognition algorithm and the object recognition algorithm, which are integrated. A vehicle, brand and model recognition algorithm and OCR algorithm read any random writing detected on the camera scene.

Face recognition algorithm: is an algorithm that can enable facial recognition, compare the results with the database, detect age, gender and dominant colors on the picture and write them to the database.

License recognition algorithm: reads license numbers on the picture by screening them with the OCR. It detects and classifies brand and model of the vehicle, dominant color on the vehicle and writes them to the database.

Database: is the place in which the data classified and searched and also analyses are kept and all usable data is present.

Multi-time search analytics; has functions of multi-time playback, filters, filter results, video management system and archive aging.

Multi-time playback: The system enables the videos recorded to be displayed for 10 times at the same time. Opacity level can be specifically adjusted in certain period of time. During playback, the operator can halt and change the time periods of opacity. It enables to make jumps on the entire video recorded by clicking on the related area thereon.

Filters: The filters in the system are programmed such as to work individually and also in cooperation with a plurality of filters. The system is capable of displaying its results in the players integrated or exporting them as video files. A plurality of filters is used in the system. Said filters are as follows;

Directional Filter: The system performs filtering for the direction in the same time up to 10 in a certain period of time. For example; this filter is used for determining the direction when a person goes out of a door and walks into a store or a car moves towards the north. The system filters all event times by mapping them and also ensures playback for them on a single screen.

Flow rate filter for the vehicle and person: The system senses and filters the flow rate if it is over the net limit. It focuses on intense times or the times when the rush in the recording archive is present. The system also, in an opposite case, allows the operator to be focused when the flow rate is stopped or below the lower limit. The operator can perform simultaneous playback for these times on a single screen.

Number Filter for the Person: The system can perform filtering when the number of the persons exceeds triggering or the minimum number of the persons becomes lower. The operator can focus on these times and perform simultaneous playback for all videos filtered on a single screen.

Motion Filter: It can be marked in order to trigger the search function by adjusting any portion, percentage and precision of the camera scene. For example, any product in a store, any car or anything moving in the scene can be triggered and programmed. All motion alerts received by the filter are determined and provided with simultaneous playback.

Advanced face recognition filter: Face recognition algorithm detects continuous faces, distinguish genders and sense dominant colors, approximate age and the same persons with or without their names. Furthermore, it writes all these data to the database to use it in further search analytics. Multi-Time Playback Search Analytics use these classified and searched information for Multi-Time Search. For example, time period is filtered in a person above 30 years of age in whom the color red is dominant and a playback is performed in the video scene for said person so as to be searched very quickly.

Advanced vehicle recognition filter: all data such as the color, brand and model of the vehicle, its classification whether as a car or a truck and its license information if any can be used as a filter according to the position of the camera.

Filter results, Video Management System and archive aging: Video Management System sets priority to filters while performing archive aging. Filter results and recordings that are subject to the filters are such that they are not deleted with priority or aging process is not applied to all frames.

Faces that are recognized as high priority recordings are such that they are alert triggers of the license numbers. Priority can be particularly programmed. For example, a person or an object in doubt can be a site or a net camera and an alert within a determined period of time.

Video brief: The video brief can be present in the system in two forms including a filter-based one and an accelerated one.

Filter-based one: The system prepares either motions or filters as multi-time brief video. Accelerated one: The system can prepare multi-time brief videos, desired acceleration settings and the multi-time video brief.

With reference to FIGURE, the flow chart of the multi-time search analytics is illustrated.

Multi-time search analytics, characterized in that it comprises following process steps of;
  recognizing objects (face recognition, license recognition, security recognition) with image sensors,
  activating software components and/or incoming alarms (FD, ANPR security and filters),
  collecting alarms in an alarm database pool,
  extracting a video with the same length in the alarm database pool,
  performing a motion recognition with H264/H265,
  recording the detected motions by a video content recorder for a next use,
  transferring detected motions to a timeline adjuster that changes the motions in accordance with the Alpha Time Zone,
  obtaining a video output from a video blender,
  obtaining a single video including an original alarm and the data outputted from the video blender from a multi-layer video blender,
  obtaining a single video including the filter-based and time lapse data using the video brief extraction algorithm.

What is claimed is:

1. A method of operating multi-time search analytics, configured to be operated without any need for an additional camera broadcasting, an additional data index, additional servers, an additional software for indexing and analytics, an additional face recognition system, a license recognition system, an object recognition system, or an additional net bandwidth for a new hardware, wherein the method of operating multi-time search analytics comprises following steps:
  recognizing objects including face recognition, license recognition, and security recognition with image sensors,
  activating software components and/or incoming alarms, wherein the software components and/or incoming alarms include a floppy drive (FD), and automatic number plate recognition (ANPR) security and filters,
  collecting the alarms in an alarm database pool,
  extracting a first video with a same length in the alarm database pool,
  performing a motion recognition with H264/H265,
  recording detected motions by a video content recorder for a next use, transferring the detected motions to a timeline adjuster and changing the detected motions in accordance with an Alpha Time Zone, obtaining a second video outputted from a video blender, obtaining a first single video including an original alarm and data outputted from the video blender from a multi-layer video blender, and obtaining a second single video including filter-based and time lapse data by using a video brief extraction algorithm.

2. The method according to claim 1, wherein, a multi-time search analytics engine uses database of a video management system and applies filters to data and obtains results, the video management system is configured to index and record video content, a face recognition algorithm is configured to perform facial recognition, compare the results with the database, detect age, gender and dominant colors on a picture and write the age, the gender, and the dominant colors to the database, license recognition algorithm configured to read license numbers on the picture by screening the license numbers with an optical character reader (OCR), detect and classify a brand and a model of a vehicle, a dominant color on the vehicle and write the brand, the model and the dominant color to the database, the database is configured for keeping the data classified and searched and analyzed, and presenting all usable data.

3. The method according to claim 1, wherein, the filters are configured to operate separately or in cooperation with each other, the filters include a directional filter, a flow rate filter for vehicles and persons, a number filter for persons, a filter for motion, and an advanced correlation filter for face recognition or for vehicle recognition.

4. The method according to claim 3, wherein, the directional filter is configured to map all event times and playback for the all event times on a single screen.

5. The method according to claim 1, wherein, the video brief in two variations comprises a filter-based video brief and an accelerated video brief.

6. The method according to claim 5, wherein, the video brief is configured to only present either the detected motions or the filters in a multi-time manner.

7. The method according to claim 1, wherein, the multi-time search analytics comprises functions of a multi-time playback, the filters, filter results, the video management system and an archive aging.

8. The method according to claim 1, wherein, the multi-time search analytics is configured to display the second video, the first single video and the second single video for 10 times simultaneously.

9. The method of according to claim 1, wherein, the multi-time search analytics comprises a recording engine, an indexing engine and a search engine.

10. The method of according to claim 9, wherein, the recording engine operates separately from the indexing engine.

11. The method of according to claim 9, wherein, file formats including avi, mp4, ts, mkv raw-frame, and raw-H264/265 are supported in the search engine.

12. The method of according to claim 9, wherein the indexing engine operates on recordings that are recorded by calculating a length of a file being continuously recorded and indexing later.

13. The method of according to claim 1, wherein the method is configured to be operated in a plurality of platforms, networks of companies and on intranet or internet.

14. The method of according to claim 1, wherein, the multi-time search analytics has a component-based system that is enterprise level, complex, scalable and distributed.

15. The method of according to claim 1, wherein, the multi-time search analytics has a system configured to use markers being put immediately when events take place and perform a filtering process by putting a minimum load on a processor power.

16. The method of according to claim 1, wherein, the multi-time search analytics has a system configured to operate in a 100% compatibility with different subcomponents and keep recordings.

17. The method of according to claim 1, wherein, the multi-time search analytics has a system configured to index an initial frame time and perform an indexing process for a length of the first video in nanosecond precision.

18. The method of according to claim 1, wherein, the multi-time search analytics has a system for displaying search results on a video display in an overlaid manner according to types of time and alarm of the search results.

* * * * *